(12) United States Patent
Ono et al.

(10) Patent No.: US 8,016,916 B2
(45) Date of Patent: Sep. 13, 2011

(54) APPARATUS AND METHOD FOR SEPARATING GAS

(75) Inventors: Yoshinori Ono, Tokyo (JP); Takashi Futatsuki, Tokyo (JP); Tetsuya Abe, Ibaraki-ken (JP); Sadamitsu Tanzawa, Naka (JP); Toshihisa Hatano, Ibaraki-ken (JP)

(73) Assignee: Japan Atomic Energy Agency, Ibaraki-ken (JP)

( * ) Notice: Subject to any disclaimer, the term of this patent is extended or adjusted under 35 U.S.C. 154(b) by 285 days.

(21) Appl. No.: 12/171,972

(22) Filed: Jul. 11, 2008

(65) Prior Publication Data
US 2009/0056552 A1    Mar. 5, 2009

(30) Foreign Application Priority Data

Jul. 12, 2007 (JP) ................. 2007-183686

(51) Int. Cl.
*B01D 53/04* (2006.01)
*B01D 53/70* (2006.01)
(52) U.S. Cl. ............ 95/88; 95/95; 95/142; 96/132
(58) Field of Classification Search ........... 96/101, 96/121, 127, 132, 133; 95/95, 128, 135, 95/142, 88
See application file for complete search history.

(56) References Cited

U.S. PATENT DOCUMENTS

| | | |
|---|---|---|
| 4,194,892 A | 3/1980 | Jones et al. |
| 5,681,369 A * | 10/1997 | Osborne .................. 95/93 |
| 5,720,797 A | 2/1998 | Yates et al. |
| 6,004,377 A | 12/1999 | Tamata et al. |
| 6,454,837 B1 | 9/2002 | Pittroff et al. |
| 6,530,980 B2 * | 3/2003 | Abe et al. .............. 96/4 |
| 7,214,258 B2 * | 5/2007 | Abidi et al. ............ 96/131 |
| 7,527,676 B2 | 5/2009 | Tajima et al. |
| 2005/0223900 A1 * | 10/2005 | Yoshida et al. .......... 96/108 |
| 2007/0084345 A1 * | 4/2007 | Tajima et al. ........... 96/101 |
| 2009/0056540 A1 | 3/2009 | Ono et al. |
| 2009/0056552 A1 | 3/2009 | Ono et al. |

FOREIGN PATENT DOCUMENTS

| | | |
|---|---|---|
| EP | 1 872 847 | 1/2008 |
| JP | 2002-273144 | 9/2002 |
| JP | 2006-297245 | 11/2006 |
| KR | 10-2006-0041269 | 5/2006 |
| WO | 2006/112472 A1 | 10/2006 |

OTHER PUBLICATIONS esp@cenet patent abstract for Japanese Publication No. 2002273144, Publication date Sep. 24, 2002 (1 page).
esp@cenet patent abstract for Japanese Publication No. 2006297245, Publication date Nov. 2, 2006 (1 page).
U.S. Office Action for U.S. Appl. No. 11/912,125 dated Oct. 7, 2009, 9 pages.

(Continued)

*Primary Examiner* — Frank M Lawrence
(74) *Attorney, Agent, or Firm* — Osha • Liang LLP

(57) ABSTRACT

There is provided a gas separation apparatus for separating a specified gas from a gas to be treated containing a plurality of gases. The gas separation apparatus includes a plurality of serially-connected separation units that separate the specified gas from other gases by using a column, and a suction unit that controls an inside of the column to a reduced pressure. At least two of the plurality of separation units differ from each other in at least one separation condition.

14 Claims, 10 Drawing Sheets

OTHER PUBLICATIONS

Notice of Allowance for U.S. Appl. No. 11/912,125 dated Oct. 25, 2010, 6 pages.
English abstract of KR1020060041269 published on May 11, 2006, 1 page.
Office Action for Korean Application No. 10-2008-0067783 mailed on Sep. 16, 2010 and English translation thereof, 10 pages.
Office Action issued in Japanese Application No. 2007-183686 mailed on Mar. 22, 2011 and English translation thereof, 9 pages.
Korean Office Action issued in Korean Application No. 10-2008-0067783 dated May 21, 2011 and English translation thereof, 8 pages.

* cited by examiner

EXAMPLE 1: OPERATION SCHEDULE FOR TWO-COLUMN SYSTEM

| TIME (MINUTE) | | 0 | 2 | 10 | 12 | 20 | 22 | 30 | 32 | 40 | ... |
|---|---|---|---|---|---|---|---|---|---|---|---|
| COLUMN 1 | INLET | GAS SUPPLY | | | GAS SUPPLY | | | GAS SUPPLY | | | ... |
| | OUTLET | $N_2$ EXHAUST LINE | | RECOVER IN $SF_6$ LINE | | $N_2$ EXHAUST LINE | | RECOVER IN $SF_6$ LINE | | $N_2$ EXHAUST LINE | |
| COLUMN 2 | INLET | | GAS SUPPLY | | | | GAS SUPPLY | | | GAS SUPPLY | |
| | OUTLET | RECOVER IN $SF_6$ LINE | | $N_2$ EXHAUST LINE | | RECOVER IN $SF_6$ LINE | | $N_2$ EXHAUST LINE | | RECOVER IN $SF_6$ LINE | |

GAS SUPPLY TO FIRST STAGE: 85% $SF_6$ ($N_2$ BALANCE)
GAS SUPPLY TO SECOND STAGE: BY CONSEQUENCE

FIG. 4

EXAMPLE 1, AT RECOVERY OUTLET OF FIRST COLUMN

C-RSA CHROMATOPAC CH=1  Report No.=1606  DATA=1:*CHRM1.C00
Sample No.=1

CALCULATION REPORT

| CH | PKNO | TIME | AREA | HEIGHT | MK IDNO | CONC | NAME |
|----|------|------|------|--------|---------|------|------|
| 1  | 1    | 6.425 | 83938 | 4270 | 1 | 144.3362 | N2 |
|    | TOTAL |     | 83938 | 4270 |   | 144.3362 |    |

$N_2$ CONCENTRATION: 144PPM
⇒CONCENTRATION OF RECOVERED $SF_6$: 99.986%

*FIG. 5*

EXAMPLE 1, AT RECOVERY OUTLET OF SECOND COLUMN

C-RSA CHROMATOPAC CH=1  Report No.=37  DATA=1:*CHRM1.C00
Sample No.=1

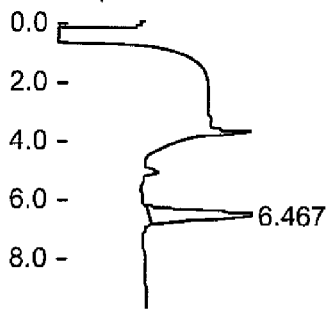

CALCULATION REPORT

| CH | PKNO | TIME | AREA | HEIGHT | MK 1DNO | CONC | NAME |
|----|------|------|------|--------|---------|------|------|
| 1  | 1    | 6.467 | 4446 | 243 | 1 | 7.6452 | N2 |
|    | TOTAL |     | 4446 | 243 |   | 7.6452 |    |

$N_2$ CONCENTRATION: 7.6PPM
⇒CONCENTRATION OF RECOVERED $SF_6$: 99.9992%

*FIG. 6*

EXAMPLE 2, AT RECOVERY OUTLET OF FIRST COLUMN

C-RSA CHROMATOPAC CH=1  Report No.=1651  DATA=1:*CHRM1.C00
Sample No.=1

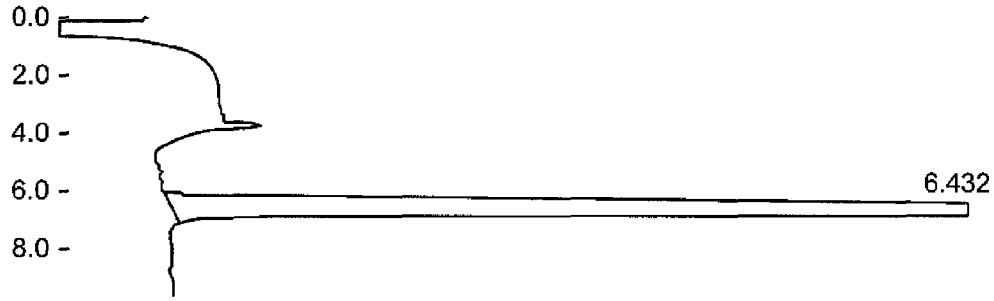

CALCULATION REPORT

| CH | PKNO | TIME | AREA | HEIGHT | MK 1DNO | CONC | NAME |
|---|---|---|---|---|---|---|---|
| 1 | 2 | 6.432 | 140716 | 7139 | 1 | 241.9689 | N2 |
| | TOTAL | | 140716 | 7139 | | 241.9689 | |

$N_2$ CONCENTRATION: 241 PPM
⇒CONCENTRATION OF RECOVERED $SF_6$: 99.976%

*FIG. 7*

EXAMPLE 2, AT RECOVERY OUTLET OF FIRST COLUMN

C-RSA CHROMATOPAC CH=1  Report No.=62  DATA=1:*CHRM1.C00
Sample No.=1

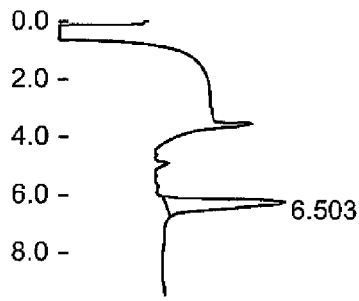

CALCULATION REPORT

| CH | PKNO | TIME | AREA | HEIGHT | MK 1DNO | CONC | NAME |
|---|---|---|---|---|---|---|---|
| 1 | 1 | 6.503 | 5221 | 285 | 1 | 8.9778 | N2 |
| | TOTAL | | 5221 | 285 | | 8.9778 | |

$N_2$ CONCENTRATION: 8.9 PPM
⇒CONCENTRATION OF RECOVERED $SF_6$: 99.9991%

*FIG. 8*

COMPARATIVE EXAMPLE 1:
OPERATION SCHEDULE FOR SINGLE-COLUMN SYSTEM

| TIME | (MINUTE) | 0 | 2 | 10 | 20 | ... |
|---|---|---|---|---|---|---|
| COLUMN | INLET | GAS SUPPLY | | | | ... |
| | OUTLET | $N_2$ EXHAUST LINE | | RECOVER IN $SF_6$ LINE | | ... |

GAS SUPPLY: 85% $SF_6$ ($N_2$ BALANCE)

*FIG. 10*

COMPARATIVE EXAMPLE 1, AT COLUMN RECOVERY OUTLET
C-RSA CHROMATOPAC CH=1  Report No.=1237  DATA=1:*CHRM1.C00
Sample No.=1

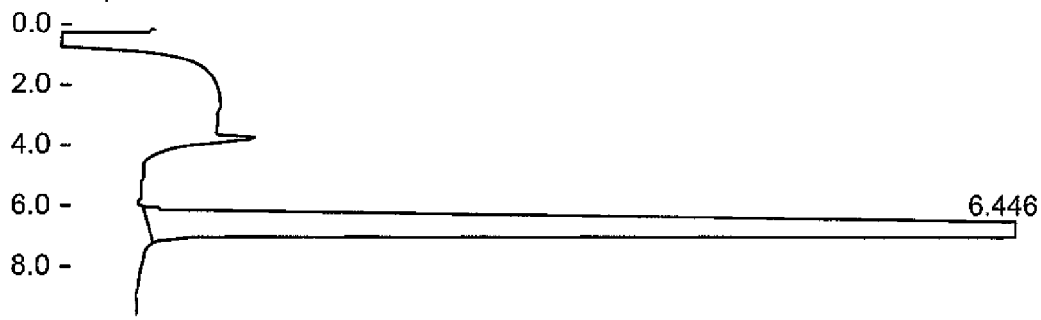

CALCULATION REPORT
| CH | PKNO | TIME | AREA | HEIGHT | MK 1DNO | CONC | NAME |
|---|---|---|---|---|---|---|---|
| 1 | 1 | 6.446 | 258236 | 13014 | 1 | 444.0527 | N2 |
| | | TOTAL | 258236 | 13014 | | 444.0527 | |

$N_2$ CONCENTRATION: 444 PPM
⇒CONCENTRATION OF RECOVERED $SF_6$: 99.955%

*FIG. 12*

COMPARATIVE EXAMPLE 2, AT RECOVERY OUTLET OF FIRST COLUMN

C-RSA CHROMATOPAC CH=1  Report No.=898  DATA=1:*CHRM1.C00
Sample No.=1

CALCULATION REPORT

| CH | PKNO | TIME | AREA | HEIGHT | MK 1DNO | CONC | NAME |
|---|---|---|---|---|---|---|---|
| 1 | 1 | 6.444 | 189409 | 9587 | 1 | 325.6999 | N2 |
|   |   | TOTAL | 189409 | 9587 |   | 325.6999 |   |

$N_2$ CONCENTRATION: 325 PPM
⇒CONCENTRATION OF RECOVERED $SF_6$: 99.967%

*FIG. 13*

COMPARATIVE EXAMPLE 2, AT RECOVERY OUTLET OF SECOND COLUMN

C-RSA CHROMATOPAC CH=1  Report No.=76  DATA=1:*CHRM1.C00
Sample No.=1

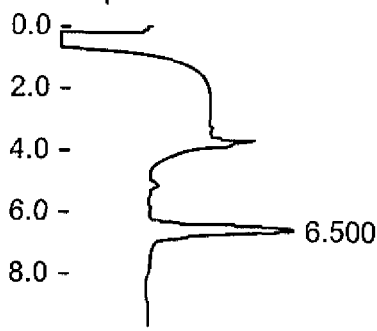

CALCULATION REPORT

| CH | PKNO | TIME | AREA | HEIGHT | MK 1DNO | CONC | NAME |
|---|---|---|---|---|---|---|---|
| 1 | 1 | 6.5 | 5806 | 308 | 1 | 9.9841 | N2 |
|   |   | TOTAL | 5806 | 308 |   | 9.9841 |   |

$N_2$ CONCENTRATION: 9.9 PPM
⇒CONCENTRATION OF RECOVERED $SF_6$: 99.9990%

*FIG. 14*

APPARATUS AND METHOD FOR SEPARATING GAS

PRIORITY INFORMATION

This application claims priority to Japanese Patent Application No. 2007-183686, filed on Jul. 12, 2007, which is incorporated herein by reference in its entirety.

BACKGROUND

1. Technical Field

The present invention relates to an apparatus and a method for separating and concentrating a specified gas from a gas to be treated containing a plurality of gases.

2. Related Art

Conventionally, in a semiconductor manufacturing process, a liquid crystal display manufacturing process, or the like, various gases are used according to the process. For instance, in a dry-etching step, a thin-film-forming step, or the like, gases of PFC (perfluoro compound) that is a compound containing fluorine such as $CF_4$, $NF_3$, $C_2F_6$, $C_3F_8$, $SF_6$, $CHF_3$, and $COF_2$, are used as a reactive gas, and an exhaust gas including them is produced.

An exhaust gas including the PFC gases is treated with various methods, because the gas has a high global warming potential and it is not preferable to discharge the exhaust gas outside in an untreated state. Such a treatment method includes a process of decomposing the PFC gas and removing its harmful effect by abatement treatment such as of a combustion type, a catalytic type, an adsorption type or a plasma decomposition type. Further, as a low-cost recovery method, there has been proposed a chromatographic separation method in which PFC gases are separated from an exhaust gas by employing a chromatographic column containing various packing materials.

For instance, Japanese Patent Laid-Open Publication No. 2002-273144 proposes a gas separation apparatus which is directed to separating a specified gas from a gas to be treated containing the specified gas comprising a plurality of components such as PFCs, and has a separation unit for chromatographically separating the specified gas from the gas to be treated by using a column packed with activated carbon.

In general, when a PFC gas is exhausted, the PFC gas is diluted with a large amount of nitrogen gas or the like so as to protect an exhaust line, a vacuum pump, or the like, and is subsequently exhausted. Accordingly, the PFC gas is diluted to a concentration as low as several percent, though this depends on conditions. For this reason, when performing the above-described harmful substance removal treatment, a PFC concentration process carried out by removing nitrogen or the like from the exhaust gas is necessary in order to eliminate nitrogen or the like that is unnecessary for the harmful substance removal treatment and to thereby increase treatment efficiency. Further, when recovering a PFC, a PFC concentration process is necessary in order to eliminate impurities such as nitrogen from the recovered PFC.

As conventional methods for separating and concentrating a specified gas such as a PFC from a gas to be treated containing a plurality of gas components, there have been proposed a membrane treatment method of separating the specified gas from the gas to be treated through a membrane, and a cryogenic distillation method of separating the specified gas by utilizing the differences in boiling points between the gases within the gas to be treated.

A membrane treatment method can separate a PFC gas from nitrogen to some extent, but the concentration of the separated PFC is only about 90% even after having been separated by multistage membrane treatment. Because this concentration is lower than the concentration of a fresh PFC gas (normally approximately 99.99%), it is difficult to reuse the separated PFC gas without performing additional treatment. Moreover, a membrane treatment method is disadvantageous in that a plurality of PFC gas components cannot be separated individually by each component. Furthermore, a cryogenic distillation method has many drawbacks, including the disadvantage that this method requires a large-scale facility and extremely high running costs, and the disadvantage that the method cannot be applied to a $CF_4/NF_3$ system or the like in which the boiling point difference is only approximately 1° C.

SUMMARY

The present invention provides an apparatus and a method for separating a specified gas with high purity and high recovery rate from a gas to be treated containing a plurality of gas components.

According to one aspect, the present invention provides a gas separation apparatus for separating a specified gas from a gas to be treated containing a plurality of gases, comprising a plurality of serially-connected separation units that separate the specified gas from other gases by using a column, and a suction unit that controls an inside of the column to a reduced pressure, wherein at least two of the plurality of separation units differ from each other in at least one separation condition.

According to another aspect, the present invention provides a gas separation method for separating a specified gas from a gas to be treated containing a plurality of gases, comprising using a plurality of serially-connected columns under a reduced pressure, providing a difference in at least one separation condition between at least two of the plurality of columns so as to create a portion in which the specified gas is concentrated using a difference in mobility of gas components in the gas to be treated occurring due to a difference in mass of the gas components, and extracting the specified gas in the concentrated portion.

According to the present invention, in a gas separation apparatus for separating and concentrating a specified gas from a gas to be treated containing a plurality of gases, by employing a plurality of serially-connected columns having a reduced pressure on the inside, and by providing a difference in at least one separation condition between at least two of the plurality of separation units, the specified gas can be separated with high purity and high recovery rate.

BRIEF DESCRIPTION OF THE DRAWINGS

FIG. 4 is a diagram showing an operation schedule used in Example 1 of the present invention;

FIG. 5 is a diagram showing a GC analysis result for an outflow gas from a first column in Example 1 of the present invention;

FIG. 6 is a diagram showing a GC analysis result for an outflow gas from a second column in Example 1 of the present invention;

FIG. 7 is a diagram showing a GC analysis result for an outflow gas from a first column in Example 2 of the present invention;

FIG. 8 is a diagram showing a GC analysis result for an outflow gas from a second column in Example 2 of the present invention;

FIG. 10 is a diagram showing an operation schedule used in Comparison Example 1 of the present invention;

FIG. 12 is a diagram showing a GC analysis result for an outflow gas from a column in Comparison Example 1 of the present invention;

FIG. 13 is a diagram showing a GC analysis result for an outflow gas from a first column in Comparison Example 2 of the present invention; and FIG. 14 is a diagram showing a GC analysis result for an outflow gas from a second column in Comparison Example 2 of the present invention.

DETAILED DESCRIPTION

Embodiments of the present invention will be next described. It should be noted that the embodiments are only examples for practicing the present invention, and that the present invention is not limited by the embodiments.

Figure 1:
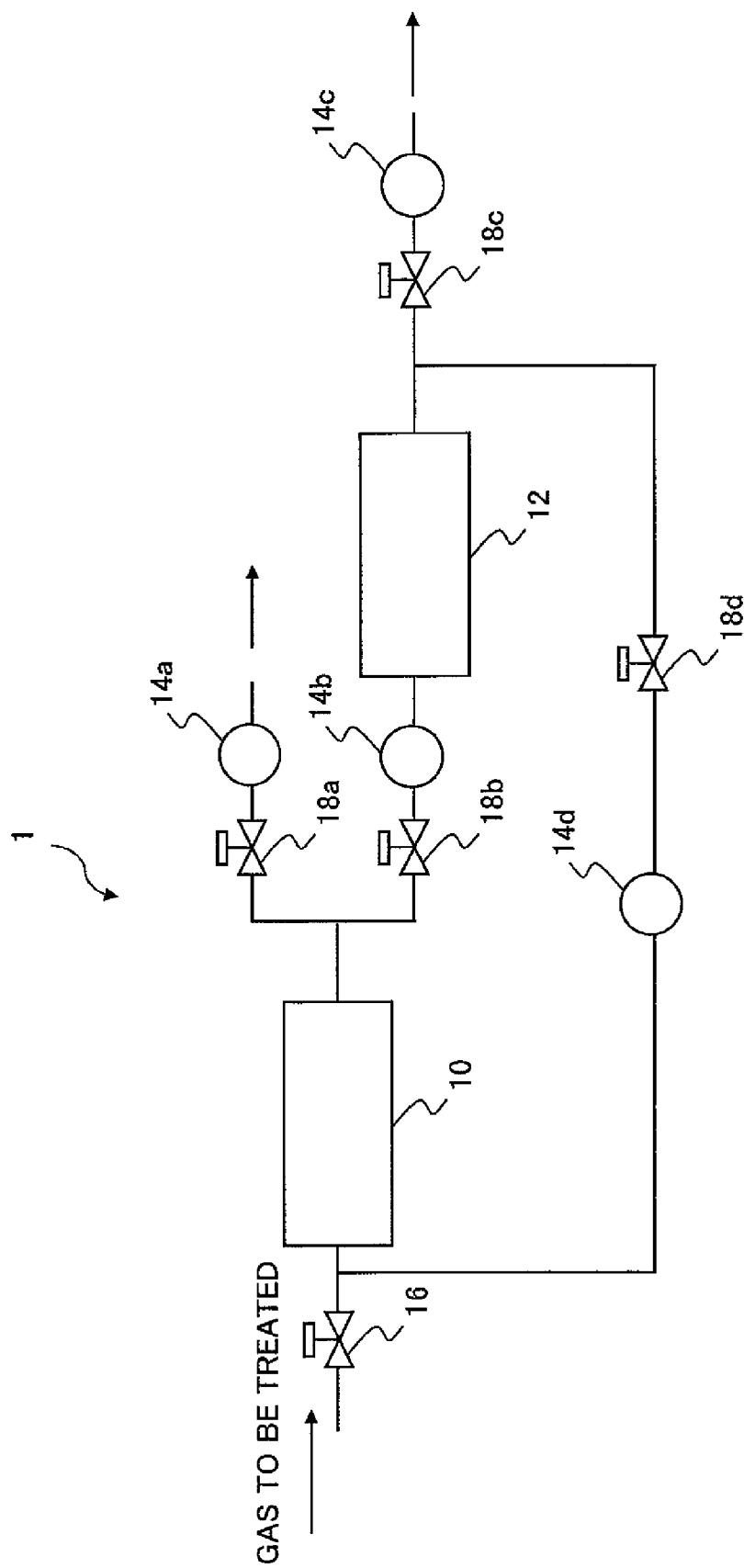
FIG. 1 is a view illustrating an outline of an example gas separation apparatus according to an embodiment of the present invention.

An outline of an example gas separation apparatus according to an embodiment of the present invention is shown in FIG. 1, and the configuration will now be described. The gas separation apparatus 1 comprises a first separator 10 and a second separator 12 which are separation units, vacuum pumps 14a, 14b, 14c, and 14d which are suction units, a supply valve 16 which is a supply control unit, and discharge valves 18a, 18b, 18c, and 18d which are flow path switching units. The vacuum pump 14d and the discharge valve 18d can serve as returning units. The discharge valve 18c can serve as an extracting unit. The discharge valves 18b and 18d can also serve as supply control units.

In the gas separation apparatus 1 of FIG. 1, a tube for introducing a gas to be treated is connected to the inlet of the first separator 10 via the supply valve 16. The outlet of the first separator 10 is connected, via a branched tubing, to the sucking side of the vacuum pump 14a via the discharge valve 18a, and to the sucking side of the vacuum pump 14b via the discharge valve 18b. The discharging side of the vacuum pump 14b is connected to the inlet of the second separator 12. The outlet of the second separator 12 is connected, via a branched tubing, to the sucking side of the vacuum pump 14c via the discharge valve 18c, and to the sucking side of the vacuum pump 14d via the discharge valve 18d. The discharging side of the vacuum pump 14d is connected, via a tubing, to a location between the supply valve 16 and the inlet of the first separator 10. In this manner, in the gas separation apparatus 1, the first separator 10 and the second separator 12 are connected serially.

A gas separation method and an operation of the gas separation apparatus 1 according to the present embodiment will now be described. In the gas separation apparatus 1 of FIG. 1, a gas to be treated containing a plurality of gases is supplied to the first separator 10 via the supply valve 16. The first separator 10 includes a column, and a packing material is packed inside the column. The gas to be treated is made to flow from the inlet of the column into the column. The outlet of the column of the separator 10 is connected to the sucking side of the vacuum pumps 14a and 14b, and the inside of the column of the first separator 10 is controlled to a state of reduced pressure by the vacuum pump 14a or 14b. With this arrangement, the gas to be treated is made to flow through the inside of the column of the first separator 10, and is separated into the specified gas and other gases by the packing material within the column. The separated gases are extracted at predetermined timings by the discharge valves 18a, 18b which are the flow path switching units. Here, non-recovered gas containing almost no specified gas (the specified gas being the target of separation and concentration) is discharged from the discharge valve 18a, and a first recovered gas containing the specified gas is supplied to the second separator 12 by the discharge valve 18b. It should be noted that, in this specification, the term "non-recovered gas" is used to refer to a gas that contains almost no specified gas. It is possible to recover and reuse the "non-recovered gas".

The second separator 12 includes a column, and a packing material is packed inside the column. The first recovered gas is made to flow from the inlet of the column into the column. The outlet of the column of the second separator 12 is connected to the sucking side of the vacuum pumps 14c and 14d, and the inside of the column of the second separator 12 is controlled to a state of reduced pressure by the vacuum pump 14c or 14d. With this arrangement, the first recovered gas is made to flow through the inside of the column of the second separator 12, and is separated into the specified gas and other gases by the packing material within the column. The separated gases are extracted at predetermined timings by the discharge valves 18c, 18d which are the flow path switching units. Here, a second recovered gas containing the specified gas is discharged by the discharge valve 18c and recovered.

In the second separator 12 (i.e., the separator of a latter stage), there are cases in which, between a fraction containing the specified gas and a fraction containing the other gases, a mixed fraction containing a mixture of the two may be generated. It is preferable to return this fraction of mixed gas using the returning units, such as the vacuum pump 14d and the discharge valve 18d, to the inlet side of the first separator 10 (i.e., the separator of a former stage). With this arrangement, it is possible to improve the overall recovery rate of the specified gas.

According to the present embodiment, a separation condition is made to differ in at least two of the plurality of separation units, namely, in the first separator 10 and the second separator 12. In this manner, the specified gas can be separated with higher purity and higher recovery ratio compared to when the same separation condition is used in the first separator 10 and the second separator 12.

The separation condition to be made different in the first separator 10 and the second separator 12, namely, the "separation condition to be varied in the individual columns", may for example be at least one of: type of the column packing material (such as material, form (which may be particles, sponges, and the like), particle diameter, and packing density of the packing material), presence or absence of the column packing material, column temperature, column material, column shape such as length and diameter, number of columns, pressure by which the gas to be treated is made to flow through the column, supply flow rate of the gas to be treated through the column, supply flow velocity of the gas to be treated through the column, manner of supplying of the gas to be treated to the column (which may be intermittent supply or continuous supply), and presence or absence of a carrier gas.

Among those listed above, a plurality of the separation conditions may be varied between the first separator 10 and the second separator 12. Further, among those listed above, rather than varying the "type of the column packing material", it is preferable to vary at least one of "column temperature", "column shape such as length and diameter", "supply flow rate of the gas to be treated through the column", and "supply flow velocity of the gas to be treated through the column", because fine adjustments can be made during operation, and for other reasons. More specifically, while it is possible to change "column length and diameter" during operation by employing a unit that enables serial or parallel connection/disconnection of columns having "identical separation conditions", from the perspectives of ease of operation, accuracy of fine adjustments, apparatus downsizing, and the like, the separation conditions of at least one of "column temperature", "supply flow rate of the gas to be treated through the column", and "supply flow velocity of the gas to be treated through the column" are more preferable as the "separation condition to be varied in the individual columns".

As described above, the recovered gas separated by the column of the first separator 10 is supplied to the column of the second separator 12, and this gas is further separated in the second stage while a separation condition is made different between the first and second stages. In this manner, the amount (concentration) of the "other gases (gases other than the specified gas)" within the gas supplied to the second stage (the recovered gas separated in the first stage) is reduced, enabling to reduce the tailing time of the "other gases" during the second separation stage. As a result, separation in the second stage can be performed efficiently, making it possible to recover the specified gas with high concentration. Further, because the gas of mixed fraction generated in the second stage includes a significant amount of the specified gas, by returning the mixed fraction gas to the inlet side of the column in the former stage (the first stage), recovery rate of the specified gas can be increased. As such, a method in which a plurality of columns are provided and serially arranged so as to carry out concentration in stages is effective because a low-concentration gas can be concentrated to a high level and obtained.

The number of separators and vacuum pumps to be used in serial connection can be selected optimally according to the number of components to be separated, the volume of the gas to be treated, and the like. When there are three or more components to be separated, three or more stages of serially-connected separators are preferably used. In such a case, a separation condition should be varied between at least two separators among the three or more stages of separators.

The separation conditions are preferably selected such that the specified gas and the other gases are favorably separated in the first stage, i.e., such that the retention times of the specified gas and the other gases are clearly differentiated from each other, to thereby enable high recovery rate of the specified gas and to achieve increased purity of the specified gas. For example, the column temperature in the former stage may be made lower than in the latter stage so as to differentiate as much as possible the retention times of the specified gas and the other gases from each other in the former stage, thereby increasing the recovery rate and purity of the specified gas. In addition, in the latter stage, the column temperature may be made higher than in the former stage so as to increase discharge velocity and to thereby enhance recovery efficiency.

By drawing the column from its outlet using vacuum and by not using a carrier gas, concentration efficiency (in the first-stage concentration) can be increased. Further, by passing the separated specified gas through a serially-connected column (the second-stage concentration), purity (concentration) of the specified gas obtained as a result can be improved. Moreover, by looping the outlet of the second stage to the inlet of the first stage, the overall recovery rate can be increased.

An apparatus and method for separating a gas according to the present embodiment can treat any mixed gas, but target, for instance, a gas containing isotopes of the same substance (component), and an exhaust gas discharged in manufacturing processes such as dry etching and thin-film formation in a semiconductor manufacturing process, a liquid crystal display manufacturing process, or the like, or in a process of manufacturing a solar cell. In particular, among the above-listed gases, an exhaust gas containing a PFC gas is preferably targeted for treatment because a PFC gas may have a high global warming potential, may impart effects on the environment when discharged, is an expensive gas, and does not have many recovery techniques available.

Examples of the gas to be treated which serves as the target of separation (target of concentration) include: a mixed gas containing at least two of PFC gas, hydrogen, heavy hydrogen, and tritium; an isotope-containing gas such as a mixed gas including $N^{14}$ and $N^{15}$ or a mixed gas including $C^{12}$ and $C^{13}$; and a mixed gas containing nitrogen gas, oxygen gas, hydrogen gas, helium gas, argon gas, and the like. The PFC gas includes any one of fluorine compounds containing at least one constituent element among C, N and S, and specifically includes any one of $CF_4$, $C_2F_6$, $C_3F_8$, $CHF_3$, $SF_6$, $NF_3$ and $COF_2$. The specified gas contained in the gas to be treated may be one kind or plural kinds. When the gas separation apparatus separates the plural kinds of the specified gases, the apparatus can easily separate the specified gases from each other by appropriately selecting a passing condition in a column or the like so that the retention time for each specified gas is differentiated from each other.

In FIG. 1, for instance, a gas to be treated containing $SF_6$ and nitrogen ($N_2$) is supplied to the first separator 10 while placing the column in a reduced pressure state using the vacuum pump 14a or 14b. Because the gases of nitrogen and $SF_6$ flow out in that order from the first separator 10, the discharge valves 18a and 18b on the outlet side are sequentially switched to separately discharge these gases. Specifically, when nitrogen is discharged from the first separator 10, the discharge valve 18a is opened while the discharge valve 18b is closed to thereby discharge nitrogen. Further, when a significant amount of $SF_6$ is discharged from the first separator 10, the discharge valve 18b is opened while the discharge valve 18a is closed to thereby discharge $SF_6$. The gas containing a significant amount of $SF_6$ is supplied to the second separator 12 and separated into the remaining nitrogen and $SF_6$. When a significant amount of $SF_6$ is discharged from the second separator 12, the discharge valve 18c is opened while the discharge valve 18d is closed to thereby discharge $SF_6$. Further, when a fraction of mixed gas (nitrogen+$SF_6$) is discharged from the second separator 12, the discharge valve 18d is opened while the discharge valve 18c is closed, and the gas of nitrogen+$SF_6$ may be supplied to the first separator 10 for re-separation.

Examples of a packing material used in the column of the separator 10 include silica gel, activated carbon, Molecular Sieve such as 3A, 4A, 5A and 13X, and zeolite. The packing material may be selected from among those materials according to the type or the like of a gas contained in the gas to be treated. For instance, when the gas to be treated is a mixed gas of $SF_6$ and $N_2$, Molecular Sieve 13X may be used as the packing material; when the gas to be treated is a mixed gas of $CF_4$ and $C_2F_6$, Molecular Sieve 13X may be used as the packing material; when the gas to be treated is a mixed gas of $NF_3$ and $SF_6$, Molecular Sieve 13X may be used as the packing material; when the gas to be treated is a mixed gas of $CF_4$ and $CHF_3$, activated carbon may be used as the packing material; and when the gas to be treated is a mixed gas of $CF_4$ and $NF_3$, activated carbon may be used as the packing material. By using the above-listed packing materials, effective separation can be performed for the respective mixed gases. When different kinds of packing materials are to be used in the former and latter stages, effective separation can be performed by employing the following combinations. Specifically, for instance, when the gas to be treated is a mixed gas of $SF_6$ and $N_2$, a combination of Molecular Sieve 13X (in the former stage) and Molecular Sieve 5A (in the latter stage) may be used as the packing materials; when the gas to be treated is a mixed gas of $CF_4$ and $C_2F_6$, a combination of Molecular Sieve 13X (in the former stage) and Molecular Sieve 3A (in the latter stage) may be used as the packing materials; when the gas to be treated is a mixed gas of $NF_3$ and $SF_6$, a combination of Molecular Sieve 13X (in the former stage) and Molecular Sieve 5A (in the latter stage) may be used as the packing materials; when the gas to be treated is a mixed gas of $CF_4$ and $CHF_3$, a combination of activated carbon (in the former stage) and silica gel (in the latter stage) may be used as the packing materials; and when the gas to be treated is a mixed gas of $CF_4$ and $NF_3$, a combination of activated carbon (in the former stage) and silica gel (in the latter stage) may be used as the packing materials.

It is possible that at least one column in the first separator 10 or the second separator 12 does not use any packing material, i.e., may be empty on the inside. A gas to be treated is introduced into a column from the inlet of the column. The outlet of the column is connected to the sucking side of a vacuum pump, and the inside of the column is placed in a reduced pressure state by the vacuum pump. With this arrangement, the gas to be treated is made to flow through the column. Inside the column, using the difference in thermal motion and diffusion velocity of atoms and molecules depending on the molecular weight of each constituent gas component contained within the gas to be treated, the gas to be treated can be separated into the specified gas and the other gases. In a case such as when the degree of vacuum inside the column is low, the suction of gas by the pressure-reducing unit may result in slight generation of viscous flow. In such as case, the specified gas and the other gases can be separated from each other also by utilizing the phenomenon that a gas having smaller molecular weight tends to be more highly influenced by viscous flow. When the former and latter separation stages are to be differed from each other in presence or absence of packing material, for instance, it is preferable to use the packing material in the former stage and to not use the packing material in the latter stage.

Temperature inside a column in the first separator 10 and the second separator 12 can be decided according to separation conditions such as the kinds of gases included in the gas to be treated and the size of the column, and is not limited in particular. For instance, when the molecular weight difference is relatively large as in a case of separating a PFC gas, the temperature is preferably in the range from approximately 20° C. to approximately 200° C., and more preferably in the range from approximately 35° C. to approximately 150° C. In the system of this type, when the temperature inside the column is below approximately 20° C., separation efficiency may become insufficient. Further, when the temperature exceeds approximately 200° C., in a case in which a packing material is used, there are possibilities that decomposition or the like of the packing material may occur, though this depends on the kind of packing material. On the other hand, when the molecular weight difference is relatively small and separation is difficult as in a case of separating isotope gases, the separation may become easier when the temperature is as low as possible within a range in which the separation target remains in the form of gas. Accordingly, in such a case, the temperature is preferably in the range from approximately −150° C. to approximately 50° C., and more preferably in the range from approximately −100° C. to approximately 20° C. Further, when the former and latter separation stages are to be differed from each other in column temperature, for instance, it is preferable to use a lower temperature in the former stage and to use a higher temperature in the latter stage.

Material constituting a column in the first separator 10 and the second separator 12 is not limited in particular, and may for example be metal such as SUS (Steel Use Stainless) steel or glass. It is considered that a difference in the very small amount of electric adsorption between the column inside surface and each gas within the gas to be treated may have an influence on a gas mobility difference. Accordingly, it is believed that, by selecting an effective material in accordance with the property of a gas component contained within the gas to be treated and using the selected material as the column material, the difference in gas mobility within the column can be emphasized. In doing so, as it is preferable to avoid causing any obstructions in the gas flow direction, it is considered to be further effective to provide a bundle of small-diameter tubes within a large-diameter tube to thereby increase the surface area contacted by the gas. When the former and latter separation stages are to be differed from each other in column material, it is preferable to, for example, use a metal (such as SUS) tube having a relatively large diameter in the former stage so as to increase the throughput, and to use a bundle of thin glass capillary columns in the latter stage so as to increase the separating power.

Although column length is not particularly limited as long as the column is sufficiently long with respect to intended gas separation, it may be more effective when the column is longer. Further, the method of providing multiple columns by which the gas concentration is increased in stages may be effective, similarly to centrifugation. In a method according to the present embodiment, because the required apparatus (such as tubes, vacuum pumps and valves) is simpler than that required for centrifugation, the specified gas can be separated and concentrated from the gas to be treated at a lower cost. When the former and latter separation stages are to be differed from each other in column length, for instance, it is preferable to use a longer column in the former stage as compared to in the latter stage, considering throughput and separation power.

Column diameter is not limited in particular, although a larger diameter may be more effective in increasing throughput. When the former and latter separation stages are to be differed from each other in column diameter, for instance, it is preferable to use a larger column diameter in the former stage as compared to in the latter stage, considering throughput and separation power.

In order to continuously process the gas to be treated and to thereby increase the throughput during a fixed period of time, it is favorable to provide a plurality of sets of the first 10 and second 12 separators using multiple columns in each set of separators, to arrange and operate the plurality of sets of the first and second separators in parallel, and to sequentially operate the multiple columns within each set of separators. The number of sets of separators and vacuum pumps can be optimally selected depending on factors such as the number of components to be separated and the processing amount of the gas to be treated. When the former and latter separation stages are to be differed from each other in the number of columns, in order to for example achieve good separation between the specified gas and the other gases in the former stage, it is preferable to use more number of columns in the former stage as compared to in the latter stage.

Pressure of the gas to be treated flowing through the columns of the first separator 10 and the second separator 12, i.e., pressure within the columns (gauge pressure at the column outlet) is preferably lower than atmospheric pressure, and more specifically, this pressure is preferably a vacuum state of approximately 1,000 Pa or lower, more preferably approximately 100 Pa or lower, and further preferably approximately 10 Pa or lower. When the reduced pressure in the column exceeds approximately 1,000 Pa, gases may not be sufficiently separated. In addition, the vacuum pumps 14a-14d are preferably operated at all times. When the former and latter separation stages are to be differed from each other in pressure of the gas to be treated, because lower pressure may cause the velocity of gas movement within a column due to diffusion to become higher resulting in faster processing speed, for instance, it is preferable to use a lower pressure in the former stage as compared to in the latter stage considering throughput. Further, because the amount of gas passing through each stage is less in the second stage compared to in the first stage, it is preferable to use a lower pressure in the former stage as compared to in the latter stage considering separation power.

Supply flow rate of the gas to be treated supplied into columns of the first separator 10 and the second separator 12 may be determined according to a separation condition such as type of a gas contained in the gas to be treated, size of the column, and column temperature. The supply flow rate is not limited in particular, but is in the range from approximately 0.1 L/event (liter per supply event) to approximately 50 L/event, for instance. When the former and latter separation stages are to be differed from each other in supply flow rate of the gas to be treated, for instance, it is preferable to increase the supply flow rate per column provided in the former stage in order to increase throughput thereof, and to decrease the supply flow rate in the latter stage because the gas supplied to the latter stage is the specified gas concentrated in the former stage and therefore the amount of the gas supplied is reduced by the amount of gas removed during the former stage.

Supply flow velocity of the gas to be treated in the columns of the first separator 10 and the second separator 12 may be determined according to a separation condition such as type of the gas to be treated, size of the column, and column temperature, and is not limited in particular. However, when the length of the column is approximately 1 m for instance, the supply flow velocity may be in the range from approximately 0.1 SLM (standard liter per minute) to approximately 50 SLM, and is preferably in the range from approximately 1 SLM to approximately 10 SLM. When the former and latter separation stages are to be differed from each other in supply flow velocity of the gas to be treated, for instance, it is preferable to use a higher supply flow velocity in the former stage as compared to in the latter stage considering throughput and separation power of the second stage, because the use of a higher supply flow velocity in the former stage may result in reducing the tailing time for discharge of a gas intended to be removed in the first stage. In this specification, the term "flow velocity" denotes the "amount of gas flow/inside area of column", without depending on the presence or absence of the packing material, or the material, packing density, or percentage of void of the packing material.

In the gas separation apparatus 1, the gas to be treated may be supplied either continuously or intermittently (in a pulse pattern). However, in achieving continuous supply, because an intermittent operation is preferable for performing separation inside a column during chromatographic separation, it is preferable to provide occasional supplies to multiple columns and to thereby attain continuous supply overall. When the form of supply is to be differed in the former and latter separation stages, for instance, it is preferable to supply the gas continuously in the former stage in order to increase throughput, and to supply the gas in a pulse pattern in the latter stage. A predetermined amount of the gas to be treated can be continuously or intermittently supplied to the columns by using the supply control units for controlling supply of the gas to be treated to the columns.

In general, a gas having smaller molecular weight has higher mobility based on thermal motion and diffusion of atoms and molecules. By using the difference in thermal motion and diffusion velocity of atoms and molecules depending on the molecular weight of each constituent gas component contained within the gas to be treated, it is possible to generate a portion, within a column, in which the specified gas is concentrated, and to extract the specified gas in the concentrated portion. More specifically, the gas to be treated is introduced into a column from one end, a time difference in the period until each constituent gas component of the gas to be treated reaches the other end of the column is used to concentrate the specified gas, and extraction can be made from the portion of the concentrated specified gas. It should be noted that an atom such as a noble gas atom that behaves as a chemically inert and independent particle is recognized as a molecule, and its atomic weight serves as the molecular weight.

Here, a gas flow within a column can be classified as below depending on the relationship between the mean free path $\lambda$ of gas molecules and atoms and the column diameter D.

(1) Where $\lambda \ll D$

In this case, it is considered that collisions between the molecules constituting the gas occur sufficiently and a certain velocity distribution is attained, such that the gas can be handled as a continuous fluid. A region that can be handled in this manner can be referred to as a viscous flow region. In a case of a gas inside a circular pipe, i.e., in a case of a circular pipe flow, the region in which the value $\lambda/D$ is approximately 0.01 or smaller is considered to correspond to the viscous flow region.

(2) Where $\lambda \gg D$

In contrast, when pressure inside an apparatus is in the course of being reduced or when an inside of an apparatus is evacuated to a high degree of vacuum and a gas is subsequently introduced therein, the mean free path $\lambda$ of the gas becomes long, such that molecular collisions within this region is considered to become insufficient. This region in which gas movement is defined by collisions of the molecules against the container wall of the apparatus rather than by collisions between the molecules constituting the gas themselves can be referred to as a molecular flow region. When in this state, the gas molecules cannot be handled as a continuous fluid but as particles. In a case of a circular pipe flow, the region in which the value $\lambda/D$ is approximately 10 or larger is considered to correspond to the molecular flow region.

(3) Intermediate State Between (1) and (2)

A gas flow having the value $\lambda/D$ between the viscous flow region and the molecular flow region can be referred to as an intermediate flow. Furthermore, a gas flow having the value $\lambda/D$ in the range from approximately 0.01 to approximately 0.1 may be referred to as a slip flow, and a gas flow having the value $\lambda/D$ in the range from approximately 0.1 to approximately 10 may be referred to as a transitional flow.

When using a gas separation method and apparatus according to the present embodiment for concentrating a specified component, the gas separation is preferably performed in the intermediate flow region or the molecular flow region. In other words, in the separation process, the flow of a gas to be treated inside a column is preferably an intermediate flow or a molecular flow.

Further, in the separation process, the gas to be treated preferably moves within the column by thermal motion or diffusion. Particles such as atoms, molecules, and ions are constantly moving in various directions at various velocities depending on temperature, and this movement can be called thermal motion. Diffusion can refer to the phenomenon in which molecules, components in a solution, and the like move from a high concentration region to a low concentration region so that the entire region eventually becomes substantially uniform without differences in concentration. It is understood that diffusion occurs by thermal motion of the molecules themselves and by collisions of the molecules against other molecules present in the surroundings. It should be noted that speed of diffusion within a gas is proportional to concentration difference, mean free path, and average velocity of the molecules. Average velocity of a gas is higher when the absolute temperature T is higher and when the molecular weight M is smaller. Accordingly, a gas having smaller molecular weight tends to diffuse more easily.

According to the present embodiment, the columns in the first separator 10 and the second separator 12 are controlled to a reduced pressure state, and do not use a carrier gas, i.e., a gas for transferring the gas to be treated. In a usual method of separating gases by column chromatography, a carrier gas such as nitrogen is used as a moving phase for the gas to be treated. Accordingly, even when a plurality of components contained in the gas to be treated are separated into each individual component, each of the separated components is obtained in a form of being included in a large amount of the carrier gas, and, in order to isolate each of the separated components, it is necessary to perform further concentration by a membrane separation technique, a cryogenic distillation technique, or the like. In contrast, when separation of a gas to be treated is carried out without using a transfer gas as in the present embodiment, no further concentration operation may be necessary, and a specified gas within the gas to be treated can be isolated easily. In other words, because a usual method of separating gases by column chromatography uses a carrier gas, the concentration of the gas intended to be separated may be lower at the column outlet compared to at the column inlet. On the other hand, in the gas separation apparatus and method according to the present embodiment, the concentration of the gas intended to be separated can be higher at the column outlet than at the column inlet. When the former and latter separation stages are to be differed from each other in the present or absence of carrier gas, for example, the former stage is configured to perform concentration while maintaining high purity of the recovered gas without using any carrier gas, and the latter stage is configured to use a carrier gas so as to quickly push out the other gases intended to be removed, thereby enabling efficient recovery of the specified gas discharged in the latter part. When employing this configuration, it is further preferable to intermittently supply the carrier gas by turning ON and OFF in accordance with the state of discharging of the other gases, by which influences of the carrier gas on the specified gas can be avoided.

Figure 2:
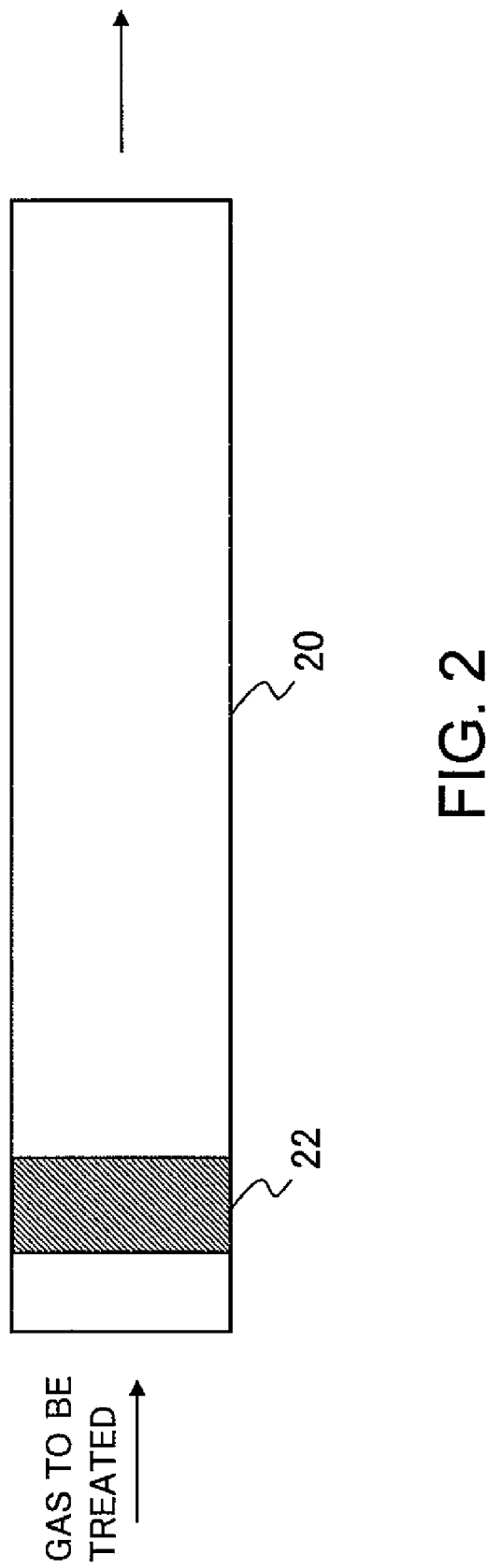
FIG. 2 is a diagram showing a cross-sectional view of an example column according to an embodiment of the present invention.

In a case in which a difference in diffusion coefficient is utilized in separating a gas to be treated, and particularly in a case in which the molecular weight difference is very small such as during separation of a gas containing isotopes, when introducing into one end of a column a gas to be treated having a velocity distribution depending on the molecular weight and temperature, it is desirable to introduce the gas while minimizing changes in the velocity distribution as much as possible. However, when intermittently introducing the gas to be treated into an empty column, because the gas to be treated is introduced into a column having a high degree of vacuum, it is understood that the velocity distribution of the molecules near the gas inlet of the column receives a strong influence from the fluid turbulences accompanying the introduction of the gas to be treated. Accordingly, it is considered that the velocity distribution based on the molecular weight differences of the respective components becomes disturbed in the vicinity of the gas inlet. In order to minimize the influences of the disturbances in velocity distribution at the time of the introduction of the gas to be treated on the separation power obtained at the column outlet, and to facilitate separation utilizing the molecular weight differences of the constituent gas components, the following measure may be effective. That is, it is effective to provide, for the purpose of flow rectification and pressure adjustment, a baffle, packing material 22, or the like at a location near the inlet of at least one column 20 in the first separator 10 and the second separator 12 as shown in FIG. 2, so as to control the flow at the outlet to a uniform state using the baffle or the packing material 22. When adopting this measure, because the pressure of the gas to be treated may be relatively high at the column 20 inlet, it is effective to provide, as the above-noted packing material 22, a packing material which is adsorptive to the gas to be treated. In other words, even when the packing material 22 has a low selective separation property with respect to the specified gas and cannot serve as a sufficient packing material for use in usual chromatographic separation, by once adsorbing the introduced gas to be treated using the packing material 22, it is possible to reduce the velocity imparted to the gas at the time of introduction. Further, because adsorption and desorption of a gas to an adsorbent may depend on temperature and pressure, the gas can be obtained in the vicinity of the outlet of the packing material 22 in a state in which changes in the velocity distribution of the gas to be treated, which depends on the temperatures of the packing material 22 and the column 20 and pressure, are minimized as much as possible.

A buffer tank for pooling the gas to be treated may be provided at a location upstream of the first separator 10 and downstream of the vacuum pump 14d, and at a location upstream of the second separator 12 and downstream of the vacuum pump 14b. The buffer tank may have a normal pressure, or may be a pressurized type for increasing a storage amount.

According to the present embodiment, the collection of each gas component at the outlet of the first 10 and second 12 separators and the switching of the valves are preferably performed based on a result of analysis of the outlet gas. The components can be detected using, for instance, a quadrupole mass spectrometer (QMS), a thermal conductivity detector (TCD), a Fourier transform infrared spectroscopy (FT-IR) or the like, and the timing of the above collection or switching may be controlled on the basis of the result. In the present embodiment, the quadrupole mass spectrometer (QMS) is preferably used. Alternatively, the switching of the valves or the like during normal operation may be controlled by time, as long as a switching condition of the valves is determined in advance on the basis of a result of analysis by QMS or the like.

In performing the gas separation, it is preferable to create an operating state in which, even when there are changes in the supply condition of the gas that serves as the source material, a stable separation state is achieved during separation in a column so as to enable separation, concentration, and recovery of a target gas. According to conventional techniques, when performing the separation, although a sequencer is used to control the timing of switching of the flow switching valves provided at the column outlets, this control is performed based on time control implemented by programming. Accordingly, an operation achieved by this control is not performed according to the actual gas separation state. In other words, the operation is performed according to a program created in accordance with a state that resulted during an initial test run, and such an operation is disadvantageous in that adaptations cannot be made with respect to changes in the introduced gas. Furthermore, when the separation state for each gas is not favorable (e.g., when a difference between gases is small), the switching operations must be carried out more precisely and quickly.

In light of the above, the present embodiment is preferably an apparatus which is capable of, by incorporating a result of analysis by an analyzer, speedily deciding the timing of switching of the flow switching valves provided at column outlets for recovering the respective gases after separation. More specifically, it is preferable to use an analyzer such as a mass spectrometer and an infrared spectrophotometer to measure in real time the types of gases in the discharged flow, and to reflect a result of the analysis in the valve switching operations.

By performing the control processing as described above, the gas separation and concentration operation can be carried out stably even when there are changes in the supply condition of the gas that serves as the source material.

According to the present embodiment, while it is possible to obtain a pure gas component at the outlet of the second separator 12, a component separated by the first separator 10 or the second separator 12 may be further concentrated using a concentrator (not shown). As the concentrator, a device such as a membrane separator and a cryogenic distillation separator may be used.

Further, in order to concentrate the specified gas to some degree before the gas to be treated is introduced into the first separator 10, a concentrator (not shown) may be disposed on the upstream of the first separator 10. As the concentrator, a device such as a membrane separator and a cryogenic distillation separator may be used.

As described above, according to the present embodiment, a plurality of serially-connected columns that are controlled to a reduced pressure state on the inside are used as separators, and a gas to be treated is made to pass through the columns while providing a difference in a separation condition between at least two of the plurality of separators. As a result, separation and concentration of $SF_6$ from a gas to be treated containing $SF_6$ and nitrogen, separation and concentration of $N^{15}$ from a gas to be treated containing $N^{14}$ and $N^{15}$, and the like can be perform easily with high purity. Accordingly, specified gases can be effectively recovered particularly in processes such as a process of manufacturing a semiconductor, liquid crystal display, solar cell, and the like, and a process of manufacturing an $N^{15}$ tracer reagent used for environmental analysis and the like.

According to the present embodiment, as explained above, a target specified gas can be concentrated at a low cost by passing a gas to be treated containing a plurality of gases through an empty column in a reduced pressure state.

In particular, the method according to the present embodiment may be extremely effective because it requires only a small and inexpensive apparatus and yet achieves a high gas concentration after the concentration processing.

Further, because the present embodiment operates at a negative pressure, diffusion of the gases to outside the system can be prevented. Accordingly, as compared to a pressurized system, safer operation can be achieved.

EXAMPLES

In the following, the present invention will be more specifically described in detail with reference to examples and comparative examples. However, the present invention is not limited to the examples described below.

Example 1

Figure 3:
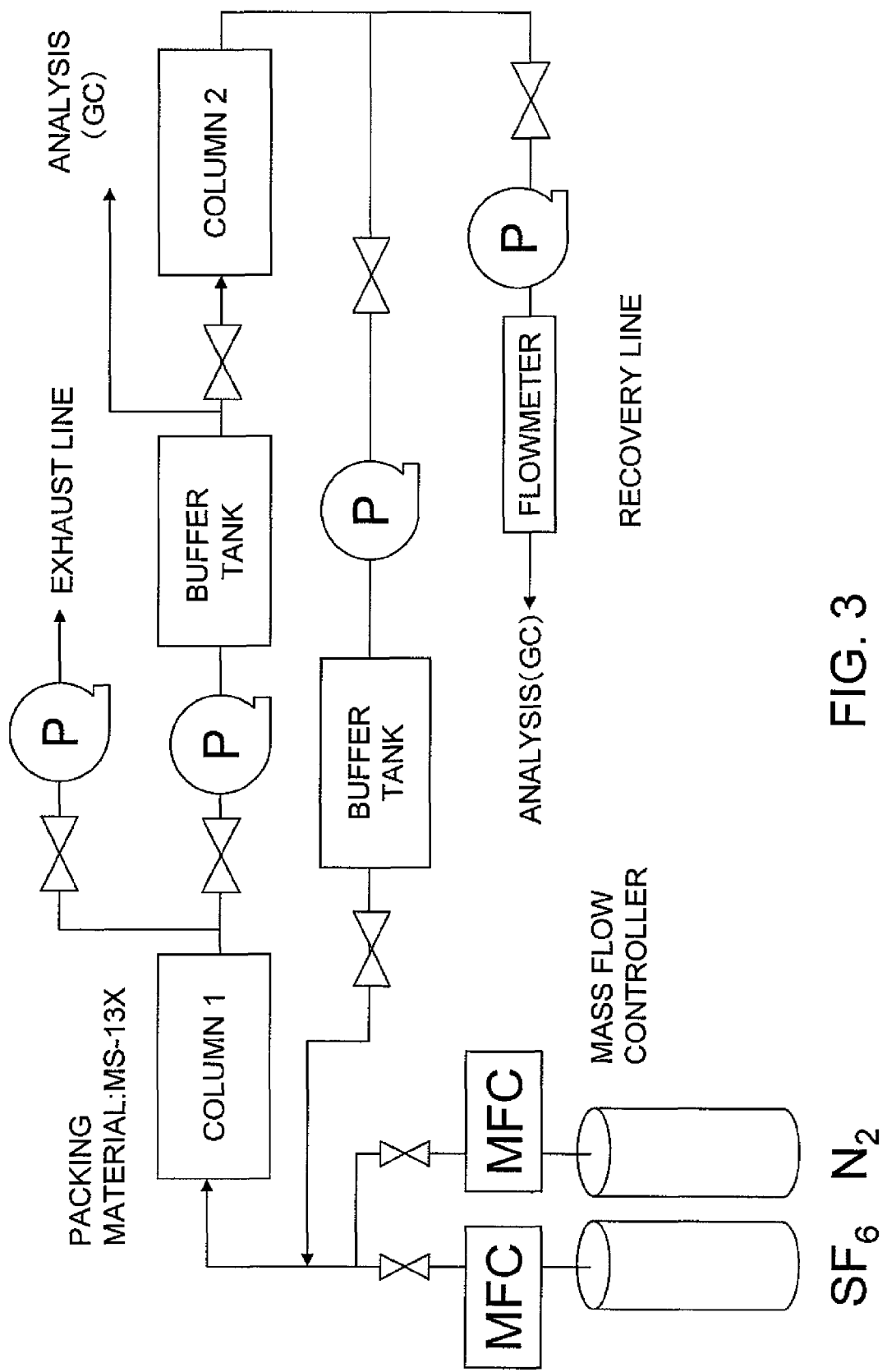
FIG. 3 is a view illustrating an outline of a gas separation apparatus used in Example 1 of the present invention.

A mixed gas (gas to be treated) containing $SF_6$ and nitrogen is separated using an experimental apparatus shown in FIG. 3. For the purpose of improving recovery rate, among the separation conditions, the column temperature is made different between the former and latter stages. Two columns each having an outer diameter of 19.05 mm, an inner diameter of 16.57 mm, and a length of 1.0 m (material of the columns: SUS) are used by serially connecting the two. Molecular Sieve 13X (a product made by GL Sciences Inc.) is used as the packing material for the columns. As for the column temperature, column 1 (former stage) is set to 40° C., and column 2 (latter stage) is set to 120° C. In a state in which the pressure at the column outlet is set to a reduced pressure state of about $1.0 \times 10^{-3}$ Pa using a vacuum pump, the separation of the mixed gas containing $SF_6$ and nitrogen is carried out. The concentration of the gas supplied to the first stage is 85% $SF_6$ ($N_2$ balance). This gas is supplied from a cylinder to the first stage at 2.0 SLM, and the supply period is two minutes. Because a mixed gas is returned from the second stage, the actual supply flow velocity in the first stage becomes 2.4 SLM. By analyzing the concentration of $N_2$ within the analysis/recovery line ($SF_6$) using a gas chromatograph (Model GC-8APT (special type) made by Shimadzu Corporation), the concentration of $SF_6$ is obtained. Other impurities are assumed to be absent. The chromatograph operation schedule is shown in FIG. 4. A cylinder for buffering purposes is provided at the recovery output of the first column stage, so as to enable batch operation in the second chromatographic separation stage. The result of the analysis of the first column stage is shown in FIG. 5, while the result of the analysis of the second column stage is shown in FIG. 6. A summary of the results is given in Table 1.

Example 2

A mixed gas (gas to be treated) containing $SF_6$ and nitrogen is separated using an experimental apparatus shown in FIG. 3. For the purpose of improving separation power, among the separation conditions, the gas supply flow velocity is made different between the former and latter stages. Other conditions are made identical, as in Example 1. A result of analysis of the first column stage is shown in FIG. 7, while a result of analysis of the second column stage is shown in FIG. 8. A summary of the results is given in Table 1.

Comparative Example 1

Figure 9:
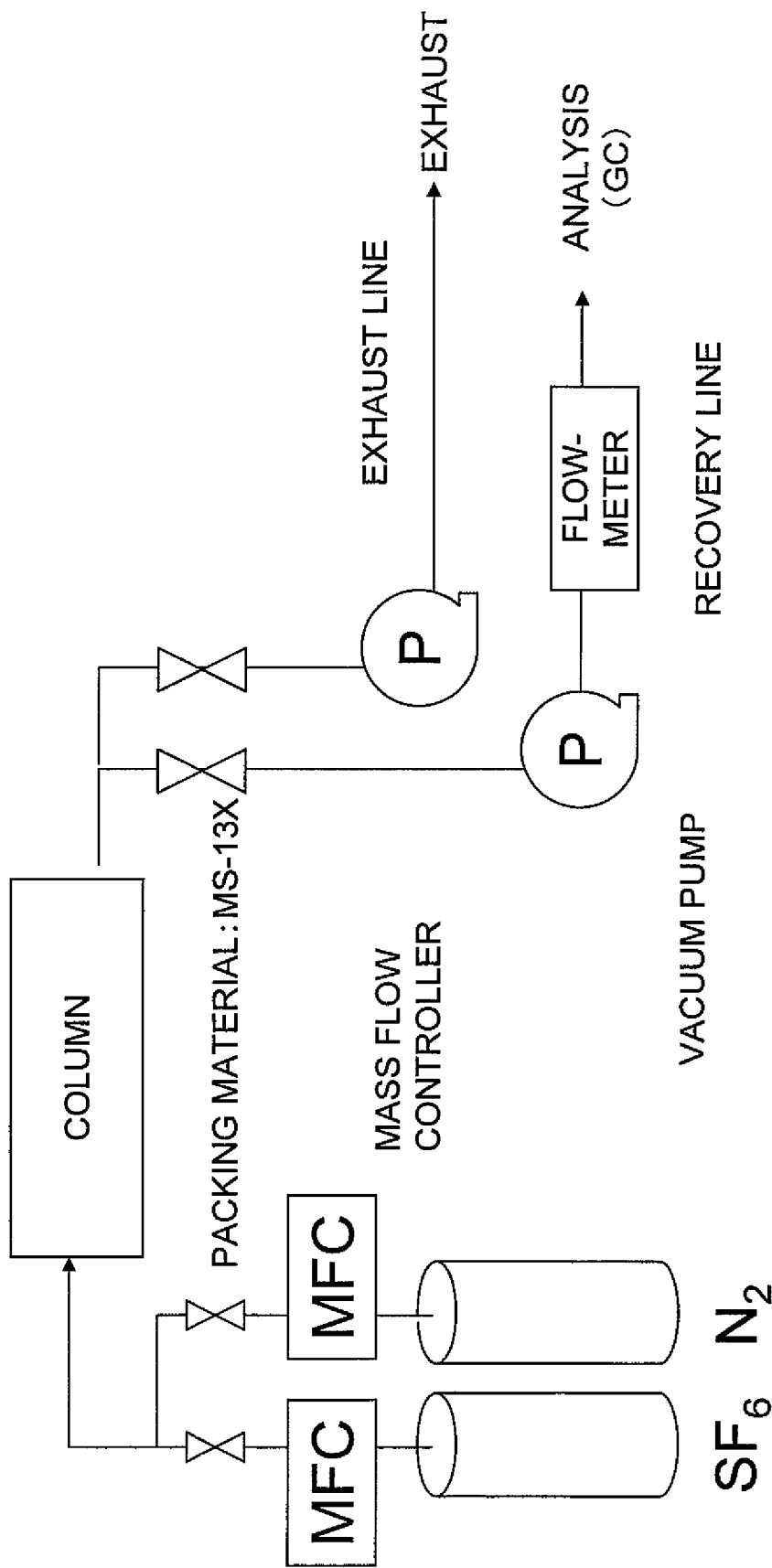
FIG. 9 is a view illustrating an outline of a gas separation apparatus used in Comparison Example 1 of the present invention.
Figure 11:
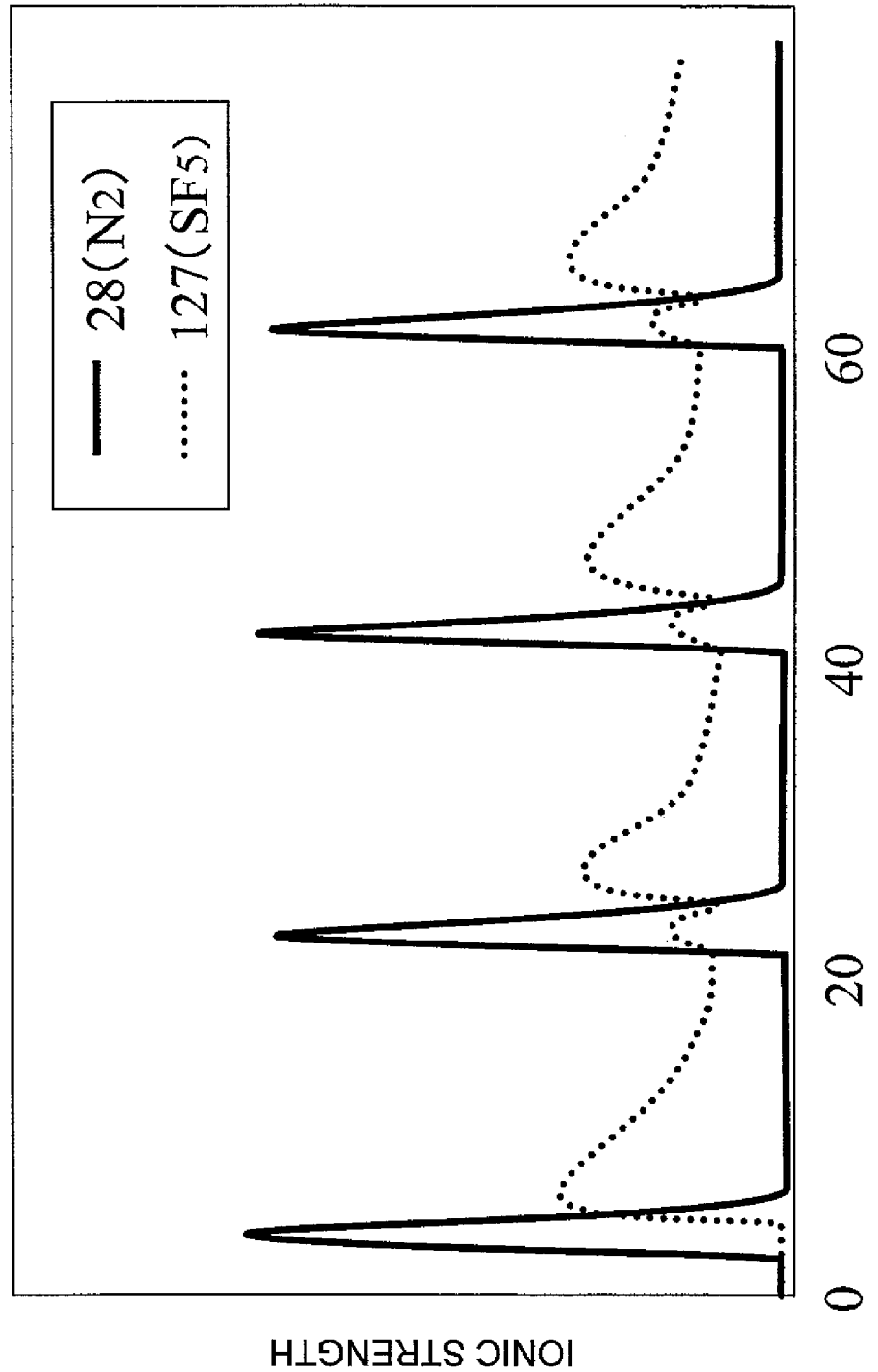
FIG. 11 is a diagram illustrating an operation in Comparison Example 1 of the present invention.

A mixed gas (gas to be treated) containing $SF_6$ and nitrogen is separated using an experimental apparatus shown in FIG. 9. A single column having an outer diameter of 19.05 mm, an inner diameter of 16.57 mm, and a length of 1.0 m (material of the column: SUS) is used. Other conditions are made identical to those in Example 1. The chromatograph operation schedule is shown in FIG. 10. Using Molecular Sieve 13X, while $N_2$ begins flowing out immediately after the gas is supplied, $SF_6$ begins flowing out at a delay. This procedure is repeated in a period of 20 minutes per cycle (as shown in FIG. 11). A GC analysis of the obtained separation result is shown in FIG. 12. A summary of the result is given in Table 1.

Comparative Example 2

A mixed gas (gas to be treated) containing $SF_6$ and nitrogen is separated using an experimental apparatus shown in FIG. 3. All separation conditions are made identical in the former and latter stages. Other than that, conditions are made identical to those in Example 1. A result of analysis of the first column stage is shown in FIG. 13, while a result of analysis of the second column stage is shown in FIG. 14. A summary of the results is given in Table 1.

TABLE 1

|  | Example 1 | Example 2 | Comparative Example 1 | Comparative Example 1 |
|---|---|---|---|---|
| Condition | Different column temperatures | Different gas supply flow velocities | Single column | Identical conditions |
| $N_2$ peak area in the first stage | 144 (FIG. 5) | 241 (FIG. 7) | 444 (FIG. 12) | 325 (FIG. 13) |
| $N_2$ peak area in the second stage | 7.6 (FIG. 6) | 8.9 (FIG. 8) | — | 9.9 (FIG. 14) |
| $SF_6$ concentration in the first stage | 99.986% | 99.976% | 99.955% | 99.967% |
| $SF_6$ concentration in the second stage | 99.9992% | 99.9991% | — | 99.9990% |
| $SF_6$ recovery rate | 80% | 76% | 66% | 72% |

As shown in FIGS. 5-8, it can be understood that the concentration in the second stage is increased in Examples 1 and 2. Further, it can be understood (from comparisons between FIGS. 5-8 and 12) that, by returning the non-recovered gas from the second stage to the first stage, the concentration at the outlet of the first stage (FIGS. 5 and 7) is improved as compared to Comparative Example 1 (FIG. 12). This improvement results because, whereas the chromatographic separation is performed using a single column in Comparative Example 1, the outlet gas from the second stage is returned to the inlet side of the first chromatographic separation stage in Examples 1 and 2, such that both the concentration and amount of $SF_6$ are increased, resulting in increased separation efficiency. As a result, the recovery rate calculated from the recovery concentration as well as the measurement of outlet flow velocity also becomes improved (80% in Example 1, 76% in Example 2). On the other hand, in Comparative Example 1, although separation can be achieved, the obtained $SF_6$ concentration is lower than the target value (5N: 99.999%), and the recovery rate calculated from the measurement of outlet flow velocity is also low (66%). Further, in Comparative Example 2, although the obtained $SF_6$ concentration is high, the recovery rate is somewhat low (72%). As can be understood from the above, the specified gas can be efficiently concentrated and recovered in Examples 1 and 2.

The invention claimed is:

1. A gas separation apparatus for separating a specified gas from a gas to be treated containing a plurality of gases, comprising:
 a plurality of serially-connected separation units that separate the specified gas from other gases by using a column; and
 a suction unit that controls an inside of at least one of the columns to a pressure less than outside the column,
 wherein at least two of the plurality of separation units differ from each other in at least one separation condition selected from a group of column temperature, column shape, supply flow rate of the gas to be treated through the column, and supply flow velocity of the gas to be treated through the column, and
 wherein the pressure inside the column is approximately 1,000 Pa or less.

2. The gas separation apparatus according to claim 1, further comprising a returning unit for returning a gas discharged from a latter separation unit among the plurality of separation units to a former separation unit.

3. The gas separation apparatus according to claim 1, wherein a plurality of columns are used in the separation units, and the plurality of columns are operated sequentially.

4. The gas separation apparatus according to claim 1, wherein a flow of the gas to be treated through the column in the separation units is an intermediate flow or a molecular flow.

5. The gas separation apparatus according to claim 1, wherein the specified gas is separated in the separation units without using a gas for transferring the gas to be treated.

6. The gas separation apparatus according to claim 1, further comprising:
 a flow switching unit provided at an outlet of the one of the columns for switching a flow path for recovering the specified gas after being separated; and
 an analyzing unit that analyzes a gas discharged from the outlet of the one of the columns,
 wherein a timing for switching the flow switching unit is decided based on an analysis result of the analyzing unit.

7. The gas separation apparatus according to claim 6, wherein the analyzing unit is a unit that can identify a gas component.

8. The gas separation apparatus according to claim 1,
 wherein the suction unit is provided at one end of the column;
 wherein the gas separation apparatus further comprises:
 a supply control unit provided at the other end of the one of the columns for controlling supply of the gas to be treated to the one of the columns such that a predetermined amount of the gas to be treated is supplied to the one of the columns in a pulse pattern, and
 an extracting unit that extracts a gas discharged from the one of the columns at a predetermined timing; and
 wherein the extracting unit extracts from a portion in which the specified gas is concentrated using a difference in mobility of gas components of the gas to be treated occurring due to a difference in mass of the gas components during a movement of the gas to be treated through the one of the columns.

9. The gas separation apparatus according to claim 1, wherein the gas to be treated is a mixed gas of $SF_6$ and $N_2$ or a mixed gas of $NF_3$ and $SF_6$, a packing material of a column for a former separation unit among the plurality of separation units is Molecular Sieve 13X, and a packing material of a column for a latter separation unit is Molecular Sieve 5A.

10. The gas separation apparatus according to claim 1, wherein the gas to be treated is a mixed gas of $CF_4$ and $C_2F_6$, a packing material of a column for a former separation unit among the plurality of separation units is Molecular Sieve 13X, and a packing material of a column for a latter separation unit is Molecular Sieve 3A.

11. The gas separation apparatus according to claim 1, wherein the gas to be treated is a mixed gas of $CF_4$ and $CHF_3$ or a mixed gas of $CF_4$ and $NF_3$, a packing material of a column for a former separation unit among the plurality of separation units is activated carbon, and a packing material of a column for a latter separation unit is silica gel.

12. A gas separation method for separating a specified gas from a gas to be treated containing a plurality of gases, comprising:

using a plurality of serially-connected columns under a pressure less than outside the columns;

providing a difference in at least one separation condition between at least two of the plurality of columns so as to create a portion in which the specified gas is concentrated using a difference in mobility of gas components of the gas to be treated occurring due to a difference in mass of the gas components; and extracting from the portion in which the specified gas is concentrated, wherein the separate condition is selected from a group of column temperature, column shape, supply flow rate of the gas to be treated through the column, and supply flow velocity of the gas to be treated through the column.

13. The gas separation method according to claim 12, wherein the gas to be treated is introduced into a column from one end, a time difference in a period until each gas component of the gas to be treated reaches the other end of the column is used to concentrate the specified gas, and the extraction of the specified gas is made from the portion in which the specified gas is concentrated.

14. The gas separation method according to claim 12, wherein pressure inside the column is approximately 1,000 Pa or less.

\* \* \* \* \*